United States Patent Office 3,364,291
Patented Jan. 16, 1968

3,364,291
PROCESS FOR PREPARATION OF MAR-RESISTANT ACRYLIC SHEET
William George Deichert, Flushing, N.Y., and Alexander Christian Bristol, Stamford, Conn., assignors to American Cyanamid Company, Stamford, Conn., a corporation of Maine
No Drawing. Filed June 23, 1965, Ser. No. 466,457
6 Claims. (Cl. 264—255)

ABSTRACT OF THE DISCLOSURE

This invention relates to a process for imparting a hard, mar-resistant, cross-linked unsaturated polyester resin composition surface to a sheet of poly(methyl methacrylate) comprising coating a glass plate with a thin layer of a blend of (A) an unsaturated polyester resin comprising the esterification product of a polyethylene glycol and fumaric acid wherein the fumaric acid is substantially the only dicarboxylic acid present, and (B) certain glycol polyacrylates, advancing the cure of the composition to an intermediate non-tacky gel, forming a cell with said glass plate with the coated side positioned internally, filling said cell with methyl methacrylate and polymerizing said methyl methacrylate, thereafter removing the surfaced sheet from the cell. Still further, this invention relates to the process of coating one side of each of two glass plates with a thin layer of the polyester resin composition used in the present invention, advancing the cure of the composition, forming a cell with said glass plates with the coated sides positioned internally, filling said cell with methyl methacrylate and polymerizing said methyl methacrylate, thereafter removing the surfaced sheet from the cell. Still further, this invention relates to the product produced according to the process of the present invention.

---

One of the objects of the present invention is to produce a sheet of poly(methyl methacrylate) having bonded thereto a hard, mar-resistant, cross-linked unsaturated polyester resin composition comprising the cross-linked reaction product of a blend of (A) an unsaturated polyester resin comprising the esterification product of a polyethylene glycol and fumaric acid wherein the fumaric acid is substantially the only dicarboxylic acid present, and (B) certain glycol diacrylates. A further object of the present invention is to provide a process for imparting a hard, mar-resistant, cross-linked unsaturated polyester resin composition surface to a sheet of poly(methyl methacrylate). These and other objects of the present invention will be discussed in greater detail hereinbelow.

The first component of the composition used in the practice of the process of the present invention is the esterification reaction product produced by reacting fumaric acid and a polyglycol wherein said glycol contains between 6 and 26 carbon atoms. The esterification reaction between the fumaric acid and the polyethylene glycol is carried out until an acid number below about 30 is reached.

Among the polyethylene glycols which may be used to esterify the fumaric acid are triethylene glycol, tetraethylene glycol, pentaethylene glycol, hexaethylene glycol, heptaethylene glycol, octaethylene glycol, nonaethylene glycol, decaethylene glycol, undecaethylene glycol, dodecaethylene glycol, tridecaethylene glycol and the like. These polyethylene glycols may be used either singly or in combination with one another. In the preparation of this polyester resin composition, the fumaric acid and the polyethylene glycol will be used in substantially equimolar proportions, since each is, for the purposes of esterification, difunctional. For preferred processing results, a slight excess amounting to about 5 to 20% of the polyethylene glycol should be used over and beyond the amount stoichiometrically calculated to esterify substantially all of the carboxyl groups in the fumaric acid.

Combinations of any of these glycols or any of these glycols in admixture with from trace amounts to 50 mole percent, based on the total number of moles of glycol used, of 2-ethyl-1,3-hexanediol or neopentyl glycol, may also be used.

The fumaric acid is a necessary component in the polyester resin used in the present invention. Comparable $\alpha,\beta$-ethylenically unsaturated dicarboxylic acids which, for other purposes, may be the full equivalent of fumaric, are far from being comparable for the purposes of the present invention. Acids, such as aconitic, itaconic, chloromaleic, and the like, cannot be substituted for the fumaric in the resin per se and still produce the results which the present polyester resin composition produces. As a consequence, the fumaric acid should be the only dicarboxylic acid present in the polyester resin. It is recognized that comparatively small amounts of other acids can be tolerated, such as trace amounts up to about 5%, by weight, based on the total weight of the acid component, without diminishing significantly the excellent properties achieved in the ultimate products produced from the composition of the present invention. Acids included in this latter group are such acids as acetic, phthalic, adipic, succinic, glacial methacrylic and the like.

The second component of the composition used in the instant process, namely, the glycol polyacrylates, are prepared by esterifying an alpha,beta, ethylenically unsaturated monocarboxylic acid selected from the group consisting of acrylic acid and methacrylic acid with a glycol selected from the group consisting of polyglycols having from 4 to 8 carbon atoms and monoglycols containing from 2 to 4 carbon atoms. Among the polyglycols which may be used to produce the glycol diacrylates are diethylene glycol, triethylene glycol, tetraethylene glycol, dipropylene glycol, bis(4-hydroxybutyl) ether and the like. Among the monoglycols which may be used to esterify the acrylic acids are ethylene glycol, propyleneglycol, the propanediols-1,2 and -1,3, the butanediols-1,2, -1,3, and -1,4, trimethylol propane and the like. These glycol polyacrylates can be used with the glycol fumarates either singly or in combination with one another. However, whether used singly or in combination, the glycol polyacrylate should be present in the total composition in an amount varying between about 10% and 40%, by weight, based on the total weight of said fumaric acid/polyethylene glycol reaction product and said glycol polyacrylate.

If desired, or considered necessary to reduce haze, the compositions used herein may contain a polymerizable styrene in amounts varying between 1% and 5%, by weight, based on the total weight of the fumaric acid-polyethylene glycol and glycol polyacrylate product. Preferably, one would use about 3%, by weight, of said styrene, same basis. Among the polymerizable styrenes which may be used are styrene per se, side chain and ring substituted halo and/or alkyl styrenes such as $\alpha$-chlorostyrene, $\alpha$-methylstyrene, o-, m-, p-methyl styrenes, o-, m-, p-chlorostyrenes, 2,4-dimethylstyrene, 2,5-dimethylstyrene, 2,3 - dichlorostyrene, 2,4 - dibromostyrene, and the like. Since the presence of a halo substituent on a styrene compound may have a tendency to impart a slight yellowness to the ultimate cured object, these halo-substituted styrenes should be avoided particularly when the ultimately produced object will be used in an area where clarity and water whiteness is desired.

It has been indicated hereinabove that the substantially linear, water-insoluble, non-gelled unsaturated polyester resin composition used in the present invention can be converted to a hard, mar-resistant, resinous product. This conversion from the ungelled or thermosetting state to the hard, thermoset state is accomplished in two steps, first, by the application of heat with catalysis to an intermediate non-tacky gel, having heat softening properties. By "heat softening properties" is meant that although some cross-linking of the glycol polyacrylate and unsaturated polyester resin take place on heating, a further and additional measure of cross-linking is still available before the total composition is converted to the thermoset state. This heat softening characteristic may be determined simply by subjecting the gel-coat to heat. It is more likely, however, that the characteristic of heat softening is determined by subjecting the gel-coat to heat and pressure in order to ascertain the presence of the heat softening property. Nevertheless, the resin in this state is still a thermosetting resin which is capable of further cross-linking and conversion to the thermoset state. Thereafter, the intermediate non-tacky thermosetting material is converted to the thermoset state by further use of catalysts and/or initiators and by use of heat. The catalytic materials or polymerization initiators which would be used to make such a conversion in state are well-known in the art and have been used extensively for this purpose in collateral compositions. Illustrative catalysts are the peroxide catalysts, such as benzoyl peroxide, tertiary butyl peroxide, and cumene hydroperoxide, among many others. The ketone peroxides may also be used such as, the methyl ethyl ketone peroxide, the diethyl ketone peroxide, and the like. The amounts of the catalytic material used will be conventional, such as between about 0.01% and 10% and more usually between about 0.1% and 3%, by weight, based on the weight of the polymerizable composition.

If desired, the polyester resin compositions used in the present invention may have incorporated therein, ultraviolet light absorbers of which a substantial plurality are well-known in the art. A significant number of these ultraviolet absorbers are disclosed in the Day et al. U.S. Patent No. 2,777,828. The amounts used are now conventional and are set forth in the aforementioned reference. If desired, photochromic materials may be incorporated into the polyester resins used in the present invention thereby permitting changes from a colored sheet to a clear sheet and vice versa, due to the absence or presence of light, including sunlight. If a permanent coloration is desired in the polyester resins, certain dyes and/or pigments may be dissolved in the unsaturated polyester resin in order to achieve a tinting.

When the unsaturated polyester resin composition used in the present invention is applied to one of the flat surfaces of a glass plate, it can be applied by use of a doctor blade, a roller coater, sprayer, or the like. The thickness of the film applied to the glass plate is generally between about 1 and 2 mils, although thicker films may be applied, such as films with a thickness up to about 10 mils. The comparative high cost of the polyester resin composition dictates against the use of films greater than about 2 mils for economic reasons, however. Still further, the hard, mar-resistant surface imparted by a 2 mil thick film is favorably comparable to the mar-resistant film imparted by a 10 mil thick film.

If it is desired only to impart the hard, mar-resistant surface to one side of the poly(methyl methacrylate) sheet ultimately produced, it is necessary only to coat one glass plate with a thin layer of the blend of the composition used in the present invention and after appropriate processing, forming the cell with the glass plate with the coated side positioned internally. On the other hand, if it is desired to impart the hard, mar-resistant surface to both sides of the poly(methyl methacrylate) sheet, it becomes necessary to coat one side of each of two glass plates with a thin layer of the resinous blend and to advance the cure to the intermediate, non-tacky gel state, and to form a cell, with the glass plates with the coated sides each positioned internally.

After the thin layer of the resinous blend has been coated onto the glass plate, the film is heat treated in order to convert the polymerizable unsaturated polyester resin composition to an intermediate, non-tacky gel having heat softening properties, which gel does not reticulate and does not crack or peel when exposed to the methyl methacrylate monomer or syrup.

Although not wishing to be bound by any theory, the chemical mechanism involved in the ultimate sheet-forming step is believed to be the inter-reaction between the reactive unsaturated polyester resin composition in the intermediate non-tacky gel sheet with the polymerizable methyl methacrylate thereby providing inter-reaction between the gel at the inter-phase with the methyl methacrylate forming a cross-linked bond.

The following examples are set forth for purposes of illustration only and are not to be construed as limitations on the present invention except as set forth in the appended claims. All parts and percentages are by weight unless otherwise specified.

POLYESTER RESIN A

Into a suitable reaction vessel equipped with thermometer, stirrer, inert gas inlet and outlet tubes, there are introduced 126 parts of triethylene glycol and 93 parts of fumaric acid. The charge is heated at about 150–200° C. for a twenty-four hour period, while carbon dioxide gas is bubbled through the reaction mixture so as to provide an inert atmosphere. At the end of the reaction period, the product, having an acid number of 17, is a light yellow viscous liquid.

*Example 1*

Into a suitable mixing vessel there is introduced 60 parts of "Resin A," 40 parts of ethylene glycol dimethacrylate, 0.1 part of 6% cobalt naphthenate, based on cobalt metal, mineral spirits solution, and 1.5 parts of benzoyl peroxide. A leveling spray is then made by adding to 4 parts of a 60% solution of methyl ethyl ketone peroxides and hydroperoxides in dimethyl phthalate, 96 parts of butyl Cellosolve. The resin solution is sprayed onto a horizontally positioned cleaned glass plate, depositing a film of approximately 1–2 mils in thickness. If necessary, the leveling spray, which thoroughly wets the surface and eliminates cratering, is applied and the coated plate is then ready for infrared cure. The coated glass plate is placed on an oscillating platform and exposed to a bank of 375 watt infrared lamps. The heat is continued until the polyester resin composition has advanced in cure to an intermediate, non-tacky gel, thereupon the plate is removed and permitted to cool to room temperature. A second glass plate similarly treated is then assembled with the first, in the usual manner of forming a cell, using gasket seals so as to prevent any leakage. Into the cell, there is introduced a sufficient quantity of methyl methacrylate so as to substantially fill the cell. The cell is placed in an oven and held at about 130° F. for about 20 hours followed by 230° F. for 3 hours. A casting of excellent surface characteristics with a hard, mar-resistant surface on each broad face is produced.

POLYESTER RESIN B

Into a suitable reaction vessel equipped as in Polyester Resin A, there are introduced 32 parts of 2-ethyl-1,3-hexanediol, 628 parts of triethylene glycol, and 464 parts of fumaric acid. The procedure of Polyester Resin A is repeated in all essential details and at the end of the reaction the product, having an acid number of about 20, is a light yellow viscous liquid.

*Example 2*

Into a suitable mixing vessel as in Example 1, there is introduced 80 parts of Polyester Resin B, 20 parts of tetraethylene glycol dimethacrylate, 0.5 part of acetic acid, 0.1 part of a 6% cobalt naphthenate solution (6% as cobalt metal) and 3 parts of benzoyl peroxide. A leveling spray is made by adding 97.4 parts of ethyl Cellosolve to 2.6 parts of a 60% solution of methyl ethyl ketone peroxide and hydroperoxide in dimethyl phthalate. The procedure of Example 1 is repeated in all essential details and there is produced a cast sheet of excellent surface characteristics with a hard, mar-resistant surface on each broad face.

POLYESTER RESIN C

Into a suitable reaction vessel equipped as in Polyester Resin A, there are introduced 483 parts of 2-ethyl-1,3-hexanediol, 496 parts of triethylene glycol, and 696 parts of fumaric acid. The procedure of Polyester Resin A is repeated in all essential details resulting in a product having an acid number of about 24.

Example 3

Into a suitable mixing vessel equipped as in Example 1, there is introduced 74.3 parts of Polyester Resin C, 20 parts of triethylene glycol dimethacrylate, 4.0 parts of styrene monomer, 0.1 part of a 6% solution of cobalt naphthenate (6% as cobalt metal), 0.024 part of glacial methacrylic acid and 1.5 parts of benzoyl peroxide. A leveling spray is made in exactly the same manner as in Example 1. The procedure of Example 1 is again repeated in all essential details. The resulting cast sheet has excellent surface characteristics, a Deichert-Webb mar-resistance value of 6 and a hard, mar-resistant surface on each broad face.

POLYESTER RESIN D

Into a suitable reaction vessel equipped as in Polyester Resin A, there are introduced 429 parts of neopentyl glycol, 619 parts of octaethylene glycol and 928 parts of fumaric acid. The procedure of Polyester Resin A is repeated in all essential details until the product is produced having an acid number of about 26.

Example 4

Into a suitable reaction vessel equipped as in Example 1, there is introduced 60.06 parts of Polyester Resin D, 20 parts of trimethylol propane trimethacrylate, 20 parts of butyl Cellosolve, 0.1 part of a 6% cobalt naphthenate solution (6% as cobalt metal), 0.5 part of acetic acid, and 3 parts of benzoyl peroxide. A leveling spray is made in exactly the same manner as in Example 1. The procedure of Example 1 is repeated again in all essential details. The resultant cast sheet has excellent surface characteristics with a hard, mar-resistant surface on each broad face displaying a Deichert-Webb mar-resistance of 2.

In filling the cell with the methyl methacrylate monomer, it is desirable to make use of a methyl methacrylate syrup which is comprised of certain amounts of poly(methyl methacrylate) dissolved in methyl methacrylate monomer.

These techniques are well-known in the art and it is not deemed necessary to elaborate in great detail on them. It is sufficient to say that a conventional procedure would reside in using about 30% of the poly(methyl methacrylate) dissolved in the monomeric methyl methacrylate in order to provide a very satisfactory syrup. Although the methyl methacrylate used can be the sole monomer used to fill the coated cell, other monomers in somewhat smaller quantities may be used with the methyl methacrylate to form copolymers. Such other monomers as methyl acrylate, ethyl acrylate, butyl acrylate and the like may be used. It is generally conventional to limit these other monomers to trace amounts up to about 1%, 2% or even 5%, by weight, based on the total weight of the secondary monomer and the methyl methacrylate.

RESIN E

Into a suitable reaction vessel equipped as in Resin A, there are introduced 1160 parts of fumaric acid, 1390 parts of triethylene glycol and 1504 parts of 2-ethyl-1,3-hexanediol. The procedure of Polyester Resin A is repeated in all essential details and at the end of the reaction the product, having an acid number of about 27, is a light yellow viscous liquid.

Example 5

To a suitable mixing vessel are introduced 51 parts of Resin E, 16 parts of tetraethylene glycol dimethacrylate, 4 parts of styrene, 22 parts of ethyl alcohol, 0.16 part of a 6% solution of cobalt naphthenate (6% based on cobalt metal), 1.3 parts of benzoyl peroxide and 5.6 parts of butyl Cellosolve. A leveling spray is made by mixing 86 parts of isopropyl alcohol, 4 parts of a 60% solution of methyl ethyl ketone peroxides and hydroperoxides in dimethyl phthalate and 10 parts of butyl Cellosolve. The procedure of Example 1 is repeated in all essential details and there is produced a cast sheet having a Deichert-Webb mar-resistance of 0.

Example 6

Into a suitable mixing vessel are introduced 64 parts of Resin E, 16 parts of ethylene glycol dimethacrylate, 2.4 parts of α-methyl styrene, 16 parts of ethyl alcohol, 0.20 part of a 6% solution of cobalt naphthenate (6% based on cobalt metal) and 1.6 parts of benzoyl peroxide. A leveling spray is made as in Example 5, and the procedure of Example 1 is then repeated in all essential details. There is produced a cast sheet having a Deichert-Webb mar-resistance of 1.

What is claimed is:

1. A process for imparting a hard, mar-resistant, cross-linked unsaturated polyester resin composition surface to a sheet of poly(methyl methacrylate) which comprises coating a glass plate with a thin layer of a blend of (A) an unsaturated polyester resin comprising the esterification product of a polyethylene glycol and fumaric acid wherein the fumaric acid is substantially the only dicarboxylic acid present and (B) a glycol polyacrylate, partially curing the composition to an intermediate non-tacky gel, forming a cell with said glass plate as one side thereof with the coated side positioned internally, filling said cell with methyl methacrylate, polymerizing said methyl methacrylate under conditions such that the polyester gel is fully cured and becomes bonded to the resultant poly(methyl methacrylate) sheet and thereafter removing the surfaced sheet from the cell.

2. A process for imparting a hard, mar-resistant, cross-linked unsaturated polyester resin composition surface to a sheet of poly(methyl methacrylate) which comprises coating a glass plate with a thin layer of a blend of (A) an unsaturated polyester resin comprising the esterification product of a polyethylene glycol, 2-ethyl-1,3-hexanediol and fumaric acid wherein the fumaric acid is substantially the only dicarboxylic acid present, and (B) a glycol polyacrylate, partially curing the composition to an intermediate non-tacky gel, forming a cell with said glass plate as one side thereof with the coated side positioned internally, filling said cell with methyl methacrylate, polymerizing said methyl methacrylate under conditions such that the polyester gel is fully cured and becomes bonded to the resultant poly(methyl methacrylate) sheet and thereafter removing the surfaced sheet from the cell.

3. A process for imparting a hard, mar-resistant, cross-linked unsaturated polyester resin composition surface to a sheet of poly(methyl methacrylate) which comprises coating a glass plate with a thin layer of a blend of (A) an unsaturated polyester resin comprising the esterification product of a polyethylene glycol, neopentyl glycol and fumaric acid wherein the fumaric acid is substantially the only dicarboxylic acid present, and (B) a glycol polyacrylate, partially curing the composition to an intermediate non-tacky gel, forming a cell with said glass plate as one side thereof with the coated side positioned internally, filling said cell with methyl methacrylate, polymerizing said methyl methacrylate under conditions such that the polyester gel is fully cured and becomes bonded to the resultant poly(methyl methacrylate) sheet and thereafter removing the surfaced sheet from the cell.

4. A process for imparting hard, mar-resistant, crosslinked unsaturated polyester resin composition surfaces to a sheet of poly(methyl methacrylate) which comprises coating one side of each of two glass plates with a thin layer of a blend of (A) an unsaturated polyester resin comprising the esterification reaction product of a polyethylene glycol and fumaric acid wherein the fumaric acid is substantially the only dicarboxylic acid present, and (B) a glycol polyacrylate, partially curing the compositions to an intermediate non-tacky gel, forming a cell with said glass plates as the sides thereof with the coated sides positioned internally, filling said cell with methyl methacrylate, polymerizing said methyl methacrylate under conditions such that the polyester gel is fully cured and becomes bonded to the resultant poly(methyl methacrylate) sheet and thereafter removing the surfaced sheet from the cell.

5. A process for imparting hard, mar-resistant, crosslinked unsaturated polyester resin composition surfaces to a sheet of poly(methyl methacrylate) which comprises coating one side of each of two glass plates with a thin layer of a blend of (A) an unsaturated polyester resin comprising the esterification reaction product of a polyethylene glycol, 2-ethyl-1,3-hexanediol, and fumaric acid wherein the fumaric acid is substantially the only dicarboxylic acid present and (B) a glycol polyacrylate, partially curing the compositions to an intermediate nontacky gel, forming a cell with said glass plates as the sides thereof with the coated sides positioned internally, filling said cell with methyl methacrylate, polymerizing said methyl methacrylate under conditions such that the polyester gel is fully cured and becomes bonded to the resultant poly(methyl methacrylate) sheet and thereafter removing the surfaced sheet from the cell.

6. A process for imparting hard, mar-resistant, crosslinked unsaturated polyester resin composition surfaces to a sheet of poly(methyl methacrylate) which comprises coating one side of each of two glass plates with a thin layer of a blend of (A) an unsaturated polyester resin comprising the esterification reaction product of a polyethylene glycol, neopentyl glycol, and fumaric acid wherein the fumaric acid is substantially the only dicarboxylic acid present, and (B) a glycol polyacrylate, partially curing the compositions to an intermediate non-tacky gel, forming a cell with said glass plates as the sides thereof with the coated sides positioned internally, filling said cell with methyl methacrylate, polymerizing said methyl methacrylate under conditions such that the polyester gel is fully cured and becomes bonded to the resultant poly(methyl methacrylate) sheet and thereafter removing the surfaced sheet from the cell.

References Cited

UNITED STATES PATENTS

| 2,070,596 | 2/1937 | Hansen | 264—255 |
| 2,704,265 | 3/1955 | Lyon | 264—255 |

FOREIGN PATENTS 685,376   4/1964   Canada.

ROBERT F. WHITE, *Primary Examiner.*

J. R. HALL, *Assistant Examiner.*